(12) United States Patent
Kayser

(10) Patent No.: US 7,345,591 B2
(45) Date of Patent: Mar. 18, 2008

(54) MEASURING DEVICE

(75) Inventor: Ralph Kayser, Luzern (CH)

(73) Assignee: Siemens Building Technologies AG, Zurich (CH)

( * ) Notice: Subject to any disclaimer, the term of this patent is extended or adjusted under 35 U.S.C. 154(b) by 277 days.

(21) Appl. No.: 11/080,676

(22) Filed: Mar. 15, 2005

(65) Prior Publication Data

US 2005/0211466 A1    Sep. 29, 2005

Related U.S. Application Data

(60) Provisional application No. 60/607,657, filed on Sep. 7, 2004.

(30) Foreign Application Priority Data

Mar. 15, 2004   (EP)  .................................. 04006043

(51) Int. Cl.
  *G08B 23/00*   (2006.01)
(52) U.S. Cl. ............................... 340/693.5; 340/693.6; 340/693.9; 439/404
(58) Field of Classification Search ................ 340/635, 340/647, 653, 656, 693.5, 693.6, 693.9, 693.12; 439/289, 404, 467; 73/866.5
See application file for complete search history.

(56) References Cited

U.S. PATENT DOCUMENTS

| | | | | |
|---|---|---|---|---|
| 4,558,916 A | * | 12/1985 | Hehl | .......................... 439/467 |
| 5,242,314 A | * | 9/1993 | Di Giulio et al. | ........... 439/404 |
| 5,892,149 A | | 4/1999 | Theuer | |
| 6,354,162 B1 | * | 3/2002 | Bobay et al. | .............. 73/866.5 |
| 6,365,424 B1 | | 4/2002 | Bauer et al. | |

FOREIGN PATENT DOCUMENTS

| | | |
|---|---|---|
| DE | 10146156 A1 | 4/2002 |
| EP | 0601507 A2 | 12/1993 |

* cited by examiner

*Primary Examiner*—Van T. Trieu
(74) *Attorney, Agent, or Firm*—Maginot, Moore & Beck

(57) ABSTRACT

An intelligent sensor module with an electrical sensor element and a printed circuit board comprises a bipartite guiding device through which electrical connecting wires are guided to the printed circuit board in an insulated fashion at a certain spacing from one another. The guiding device is configured in such a way that it can be used directly as a production tool during mounting of the sensor element. The intelligent sensor module can be produced cost effectively with high quality through the use of the guiding device.

14 Claims, 4 Drawing Sheets

MEASURING DEVICE

CROSS-REFERENCE TO RELATED APPLICATIONS

This application is claimed Priority under 35 U.S.C.§ 119 to provisional patent application No. 60/607,657 filed on Sep. 7, 2004 and European patent application No. 04006043.6 filed on Mar. 15, 2004.

BACKGROUND OF THE INVENTION

The invention relates to a measuring device of the type named in the preamble of claim 1.

Such measuring devices are advantageously used in heating, ventilating and air conditioning (HVAC) technology for buildings in order to sense a process variable. For example, a measuring device of this type is a device for sensing the air humidity in a room or in a device for supplying or removing air.

Measuring devices of this type can also be used for sensing the illumination level or for gas detection.

The present invention can be used in principle when process variables are sensed with the aid of sensor elements which have electrical connecting wires. A measuring device of this type can therefore also be used in a vehicle.

A known measuring device for sensing air humidity has a capacitive humidity sensor and a temperature sensor.

Connecting wires of the two sensors are connected to an electronic circuit via plug-in or soldered connections or to a connecting cable in order to sense electric measuring signals.

SUMMARY OF THE INVENTION

It is the object of the invention to provide a measuring device which has electric sensors and in which noninsulated thin connecting wires of a sensor—for example such wires with a diameter of the order of magnitude of 0.1 mm—can also be connected to a printed circuit board reproducibly, reliably and cost effectively.

The said object is achieved according to the invention by means of the features of claim 1. Advantageous refinements follow from the dependent claims.

BRIEF DESCRIPTION OF THE DRAWINGS

Exemplary embodiments of the invention are explained in more detail below with the aid of a drawing, in which.

DETAILED DESCRIPTION OF THE INVENTION

Figure 1:
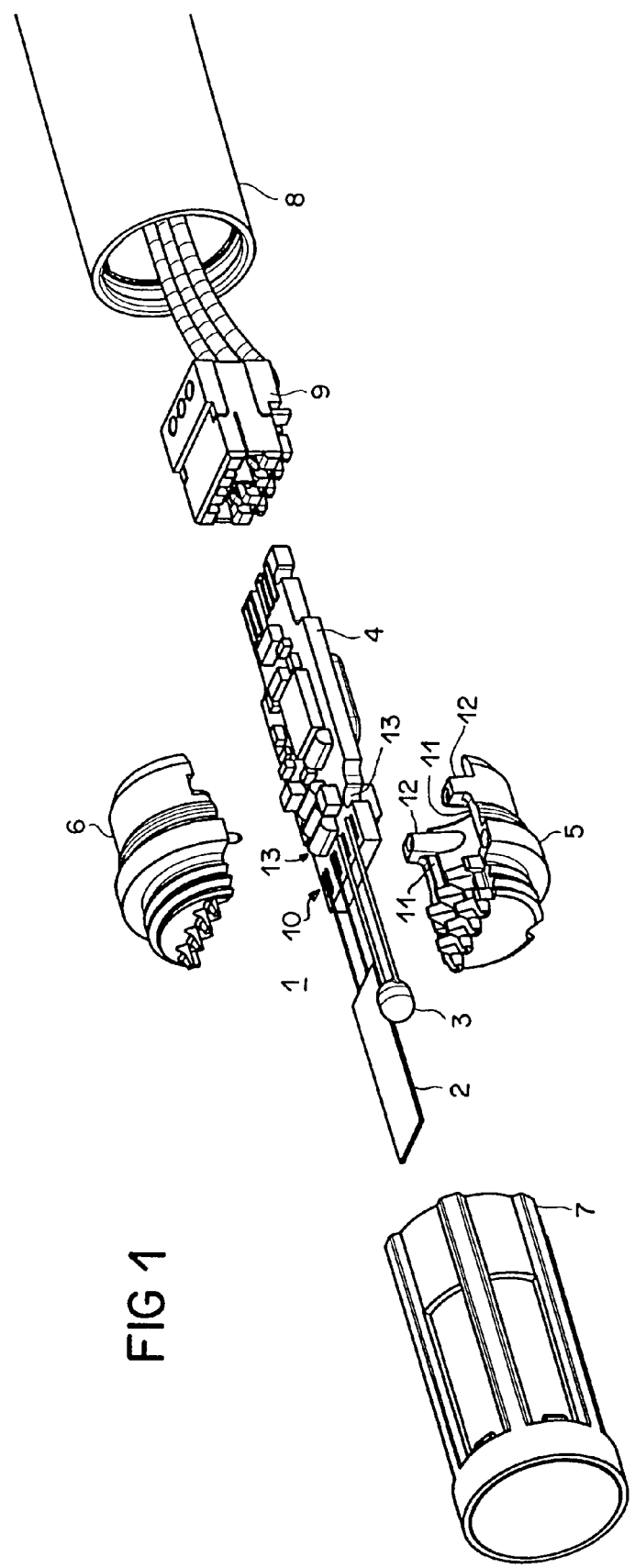
FIG. 1 shows an exploded illustration of a measuring device with a sensor module.

In FIG. 1, numeral 1 denotes a sensor module with a first sensor element 2 and a second sensor element 3, with a single-layer or multilayer printed circuit board 4, and with a first shell 5 and a second shell 6.

By way of example, the first sensor element 2 is a humidity sensor, and the second sensor element 3 is a temperature sensor. The relative humidity of a room or of an air duct, for example, can be sensed with the two sensor elements 2 and 3.

Whether the sensor module 1 has a number of sensor elements or only a single sensor element is fundamentally irrelevant to the present invention.

The two shells 5 and 6 are designed in such a way that when joined they perform a holding function of the sensor module 1.

If required, the sensor elements 2 and 3 are protected by a cover or by a filter 7, which are advantageously fastened on the sensor module 1 by the two shells 5 and 6.

Particularly for use in a duct probe, the printed circuit board 4 can be covered by a sensing tube 8 that is advantageously fastened on the sensor module 1 via two shells 5 and 6.

The printed circuit board 4 is typically connected to a regulating or control device, for example to a higher-level system via a cable provided with a plug 9. Arranged in one variant on the printed circuit board 4 is a communications device for wireless data transmission between the sensor module and the higher-level system.

Owing to their configuration, the two shells 5 and 6 advantageously serve as a production tool during mounting of the) sensor module 1. The shapes of the printed circuit board 4 and the first shell 5 are advantageously coordinated with one another such that the printed circuit board 4 is mounted in the first shell 5 at least in a region 10 in which the sensor elements 2 and 3 are to make contact with the printed circuit board 4. Moreover, the shells 5 and 6 and the printed circuit board 4 have mutually coordinated structural means which secure the printed circuit board 4 in the mounted state in the two shells 5 and 6.

For the purpose of mounting the printed circuit board 4, the first shell 5 has, by way of example, steps 11 that are situated opposite one another and determine the positioning of the printed circuit board 4 on the first shell 5. By way of example, the first shell 5 additionally has cam noses 12 which secure the printed circuit board 4 in the mounted state in the shells 5 and 6 in conjunction with cutouts 13 formed in the printed circuit board 4.

Figure 2:
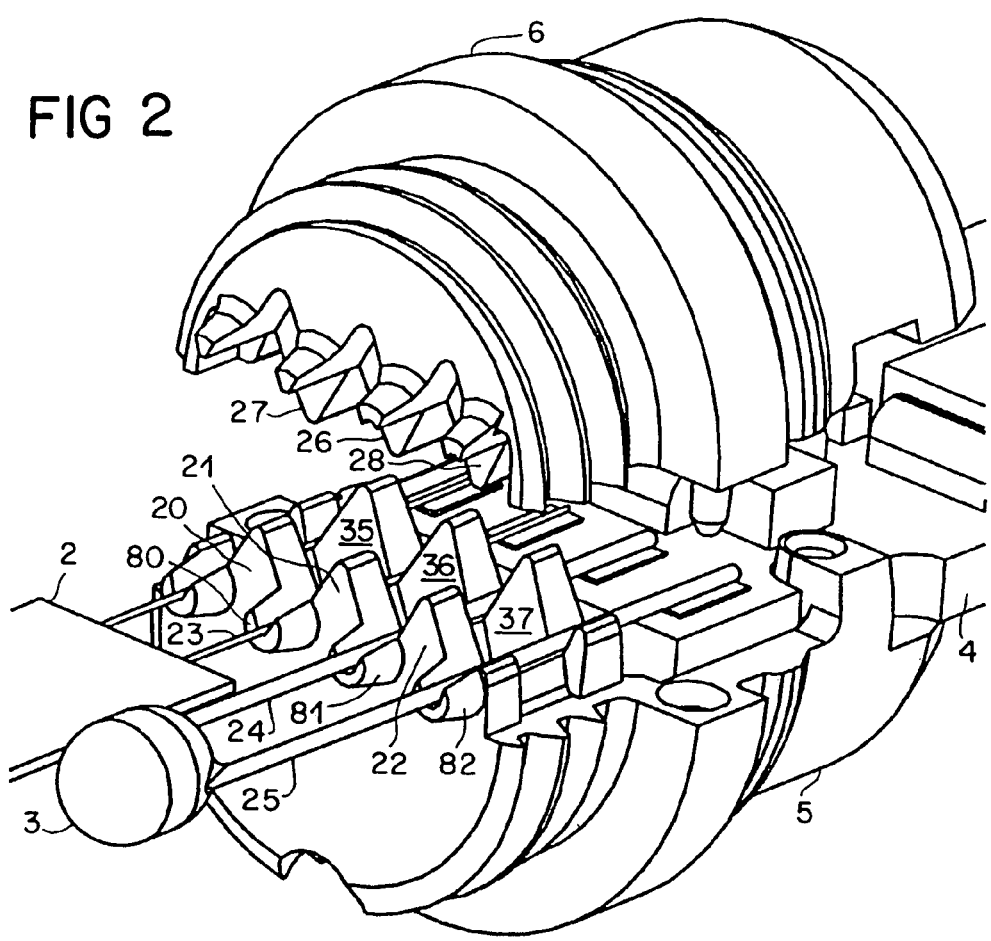
FIG. 2 shows the sensor module with parts of a guiding means for terminals of sensor elements.

In FIG. 2, the printed circuit board 4 is mounted in the first shell 5, which can be used as a production tool, the second shell 6 being illustrated in the raised state.

A first tooth 20, a second tooth 21 and a third tooth 22 belong to a first row of teeth which is arranged facing the sensor elements 2 and 3 and is advantageously formed out of the first shell 5, and through which electrical connecting wires 23, 24 and 25 of the sensor elements 2 and 3 are guided to the printed circuit board 4 in an insulated fashion at a certain spacing from one another.

The electrical connecting wires 23, 24 and 25 are advantageously directly soldered to the printed circuit board 4.

Figure 3:
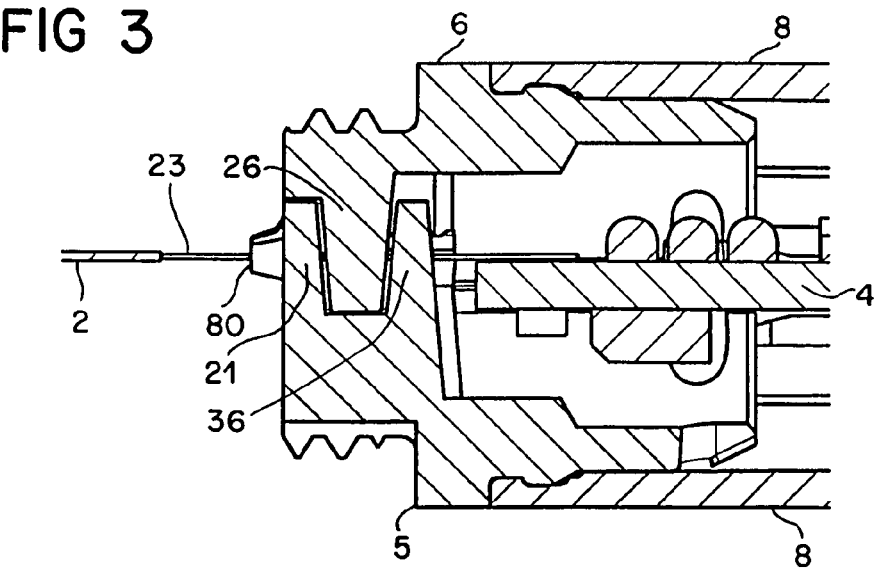
FIG. 3 shows a detail of a sectioned illustration of the sensor module.

The second tooth 21 is illustrated in a section in FIG. 3. 26 denotes a fourth tooth, which belongs to a second row of teeth that is offset from the first row of teeth toward the printed circuit board and is formed out of the second shell 6.

Figure 4:
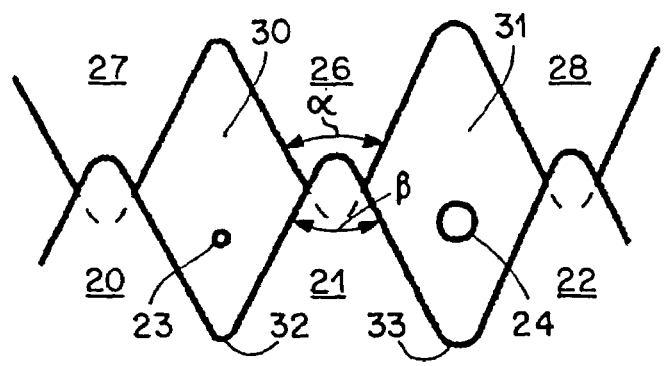
FIG. 4 shows a diagram relating to the mode of operation of the guiding means.

For the sake of better understanding of the mounting method enabled by the two shells 5 and 6, FIG. 4 illustrates in a detailed and a simplified fashion the first row of teeth, formed in the first shell 5, and the second row of teeth, formed in the second shell 6, the two shells 5 and 6 not yet being completely joined, and the view being illustrated from the sensor elements 2 and 3. In addition to the fourth tooth 26, the second row of teeth has a fifth tooth 27 and a sixth tooth 28.

The row of teeth that has the teeth 20, 21 and 22 and is formed in the first shell 5, and the row of teeth that has the teeth 26, 27 and 28 and is formed in the second shell 6, the teeth 26, 27 and 28 being directed contrary to the teeth 20, 21 and 22 of the first row of teeth, form a guiding means that is arranged between the printed circuit board 4 and the sensor elements 2 and 3 and through which the electrical connecting wires 23, 24 and 25 are guided to the printed circuit board 4 in an insulated fashion at a certain spacing from one another.

The precise shaping and layout of the guiding means can be adapted within wide limits to requirements that arise; thus, for example, to the number and mass of the sensor elements used, to the shape and diameter of the connecting wires, to the required quality of the sealing around the connecting wires, and to a required resistance to creepage or else withstand voltage between individual connecting wires.

The two shells 5 and 6 are typically fabricated from a plastic, certain thermoplastics which scarcely pick up moisture being particularly advantageous.

If necessary, cavities existing between the mounted guiding means and the connecting wires are sealed with a casting resin that is advantageously introduced from the printed circuit board 4.

The teeth 20, 21, 22, 26, 27 and 28 are constructed substantially in the shape of wedges in one advantageous design. The two rows of teeth are constructed and arranged in such a way that a first channel 30, assigned to a first connecting wire 23, is bounded by two neighboring teeth 20 and 21 of the first row of teeth and by two neighboring teeth 27 and 26 of the second row of teeth. A second channel 31 assigned to a second connecting wire 24 is bounded by two further neighboring teeth 21 and 22 of the first row of teeth and by two further neighboring teeth 26 and 28 of the second row of teeth.

When the two shells 5 and 6 are joined, the cross section of the first channel 30, and also the cross section of the second channel 31 are reduced more and more, the connecting wire laid in the first channel 30 being captured and positioned in a saddle 32 formed between the first tooth 20 and the second tooth 21, and the connecting wire laid in the second channel 31 also being captured and positioned in a further saddle 33 formed between the second tooth 21 and the third tooth 32.

A gradient of the tooth flanks that is dependent on a wedge angle α of the teeth of the second row of teeth or on a wedge angle β of the teeth of the first row of teeth is selected to be at least so steep that no self-locking occurs upon capture of the connecting wires 23 and 24. The saddle 32 or 33 formed between neighboring teeth of a row of teeth is advantageously coordinated with the shape and diameter of the accommodated connecting wire 23 or 24 so as to attain a certain degree of sealing between the sensor element 2 or 3 and the printed circuit board in the mounted state of the two joined shells 5 and 6.

If required, the guiding means has a third row of teeth, which is arranged between the second row of teeth and the printed circuit board 4 and formed on the first shell 5. The third row of teeth advantageously has a seventh tooth 35 (FIG. 2), an eighth tooth 36 and a ninth tooth 37, the connecting wire 23 of the first sensor element 2 lying between the seventh tooth 35 and the eighth tooth 36, and the connecting wire 24 of the second sensor element 3 lying between the eighth tooth 36 and the ninth tooth 37. Seen from the sensor elements 2 and 3, the teeth 35, 36 and 37 of the third row of teeth are advantageously arranged precisely behind the corresponding teeth 20, 21 and 22 of the first row of teeth, and the second row of teeth is inserted between the first and the third rows of teeth in the joined state of the two shells 5 and 6.

Figure 5A:
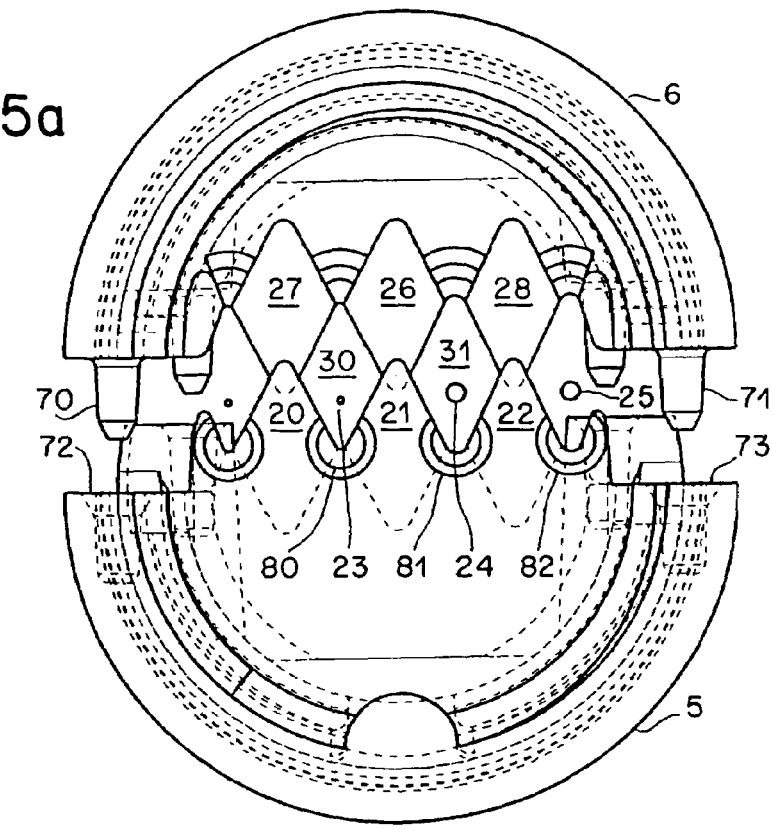
FIG. 5*a* shows a view of the guiding means in the mounted state.
Figure 5B:
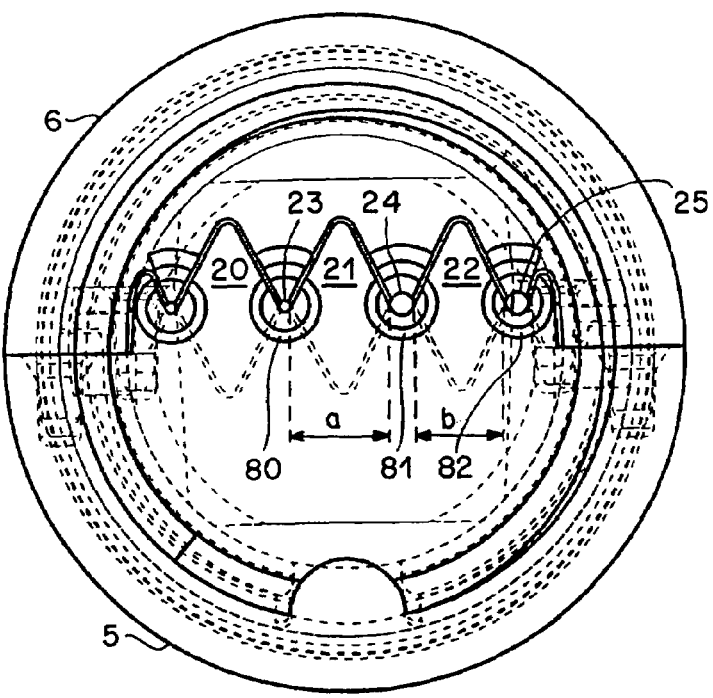
FIG. 5*b* shows a further view of the guiding means in the mounted state.

The two shells 5 and 6 are illustrated in FIG. 5a and FIG. 5b in a view from the sensor elements 2 and 3, the two shells 5 and 6 in FIG. 5a not yet being completely joined, while those in FIG. 5b are completely joined.

The second row of teeth, displaced rearward by comparison with the first row of teeth, is illustrated in FIG. 5a with both tips of the teeth 27, 26 and 28, said tips being drawn in part by dashes—that is to say being marked invisibly. It is advantageous to arrange a tooth 27 or 26 or 28 precisely behind a corresponding tooth 20 or 21 or 22, the tooth tips of the first row of teeth being directed opposite to the tooth tips of the second row of teeth.

The two shells 5 and 6 advantageously have positioning means which can be used to align the two shells 5 and 6 with one another precisely as they are being joined.

For the purpose of accurate positioning, the second shell 6 has, for example, cam noses 70 and 71 which are introduced as the two shells 5 and 6 are being joined into holes 72 and 73 respectively cut out in the first shell 5.

In FIG. 5b, a denotes the distance between the two juxtaposed connecting wires 23 and 24, and b denotes the distance between the two juxtaposed connecting wires 24 and 25.

If the distance a or b between two connecting wires is so small that impermissibly high leakage currents could build up between the connecting wires 23 and 24 or 24 and 25, respectively, on the surface of the two shells 5 and 6, a surface shape is advantageously fashioned on the two shells 5 and 6 in such a way that a path which is decisive for leakage currents is greater than the distance a or b between the connecting wires 23 and 24 or 24 and 25, respectively. A substantial reduction in leakage currents can be achieved by virtue of the fact that a superstructure 80, 81, and 82 substantially in the shape of a cylindrical stump is formed in each case at the exit sites of the connecting wires 23, 24, 25. It can be seen clearly in the isometric illustration of FIG. 2, in particular, that in the case of the second sensor element 3 the path between the connecting wires 24 and 25 that is decisive for a leakage current through the superstructure 81 constructed at the exit site of the connecting wire 24 and through the superstructure 82 constructed at the exit site of the connecting wire 25 is substantially larger than the spacing between the two connecting wires 24 and 25.

If sealing compound is used, the two shells 5 and 6 are advantageously coordinated with the diameters and the shape of the connecting wires 23, 24 and 25 in such a way that on the sensor side a sealing compound applied on the printed circuit board side to the two shells 5 and 6 does not effectively impair a shaping of the guiding means which is decisive for leakage currents between the connecting wires 23, 24 and 25.

In the exemplary embodiments illustrated in the drawing, the two shells 5 and 6 are illustrated completely separated before being joined. In one variant of the sensor module 1, the two shells 5 and 6 are connected to one another by a hinge advantageously arranged to the side of the shells 5 and 6, a rotation axis of the hinge lying parallel to the connecting wires 23, 24 and 25. By way of example, the hinge is constructed directly in the case of unipartite forms of the two shells 5 and 6.

Figure 6:
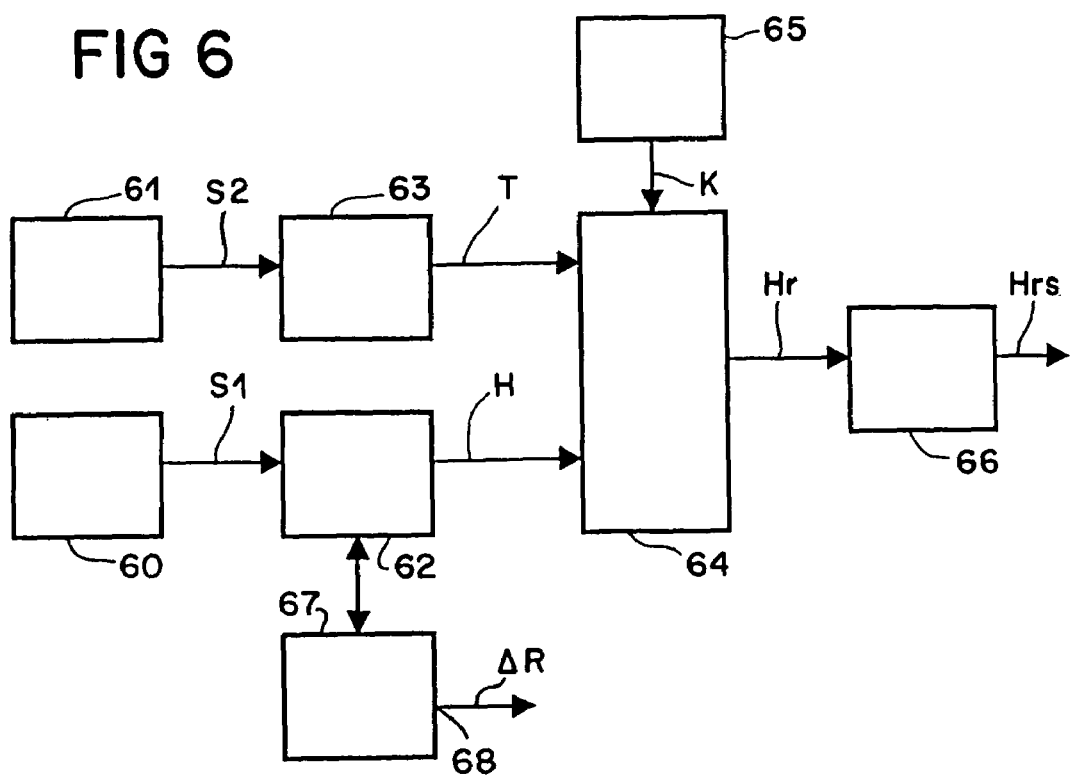
FIG. 6 shows a block diagram of the measuring device in a design for sensing relative humidity.

A measuring device illustrated in FIG. 6 has a capacitive humidity sensor 60 and a temperature sensor 61. In order to form a humidity signal H, an electric signal S1 of the humidity sensor 60 is advantageously led to a first signal converter 62 connected to the humidity sensor 60 while, for the purpose of forming a temperature signal T an electric signal S2 of the temperature sensor 61 is advantageously led to a second signal converter 63 connected to the temperature sensor 61. The two signal converters 62 and 63 are connected on the output side to a microprocessor 64.

A data memory 65 has correction data K for correcting the humidity signal H. An output signal Hr corresponding to the sensed relative air humidity can be calculated by the microprocessor 64 with the use of the humidity signal H, the temperature signal T and the correction data K.

If required, the output signal Hr is conditioned in an interface unit 66 for a certain communications standard, and made available as a standardized output signal Hrs.

In an advantageous design of the measuring device, a variation in the important sensor characteristic is sensed by a monitoring unit 67 over a lengthy period, that is to say over several months or years. In the exemplary embodiment according to FIG. 6, a variation in the ohmic resistance of the humidity sensor 60 is sensed by the monitoring unit 67. A sizeable deviation of the resistance value of the capacitive humidity sensor 60 can indicate an error or advanced ageing of the humidity sensor 60. For the purpose of an error diagnosis, a state signal AR is output at an output 68 and is, for example, evaluated by the microprocessor 64 or passed on. The state signal AR is, for example, passed on as additional information with the output signal Hr, or made available independently of the output signal Hr in one variant of the measuring device.

The signal converters 62 and 63, the microprocessor 64 and the data memory 65 are advantageously arranged on the printed circuit board 4 (FIG. 1). Depending on requirement, the interface unit 66 is accommodated on the printed circuit board 4 or, in one variant, in a further housing on the side of the sensing tube 8 averted from the printed circuit board 4.

The invention claimed is:

1. A sensor module with at least one sensor element having electrical connecting wires, and a printed circuit board, the electrical connecting wires of the sensor element being connected to the printed circuit board in an electrically conducting fashion,
   characterized by a guiding device that is arranged between the printed circuit board and the sensor element and through which the electrical connecting wires are guided to the printed circuit board in an insulated fashion at a certain spacing from one another,
   the guiding device having a first part and a second part, and the connecting wires being arranged between the first part and the second part,
   the first part having essentially wedge-shaped teeth which are constructed and arranged in such a way that a connecting wire lies between the two teeth arranged next to one another, and
   the second part having essentially wedge-shaped teeth that are designed and arranged in such a way that the connecting wire lies between two teeth arranged next to one another, and
   the teeth of the first part being arranged offset from the teeth of the second part.

2. The sensor module as claimed in claim 1, characterized in that the guiding device have at an exit site of a connecting wire a surface shape through which a path decisive for a leakage current between the connecting wire and a further connecting wire is larger than the spacing between the two connecting wires.

3. The sensor module as claimed in claim 1, characterized in that two neighboring teeth of the first part form a gap in which a connecting wire is captured, a saddle of the gap on which the connecting wire rests and from which one tooth flank each of the two neighboring teeth emerges, lying in a plane having a conducting layer of the printed circuit board.

4. The sensor module as claimed in claim 1, characterized in that the first part is constructed on a first shell, and in that the second part is constructed on a second shell, the printed circuit board being fastened at least on one of the two shells.

5. The sensor module as claimed in claim 4, characterized in that the printed circuit board is mounted in the first shell.

6. The sensor module as claimed in claim 4, characterized in that the two shells are adapted to the diameters and the shape of the connecting wires of the sensor element in such a way that on the sensor side a sealing compound applied on the printed circuit board side to the two shells does not substantially impair a shaping of the guiding device which is decisive for leakage currents between the connecting wires.

7. The sensor module as claimed in claim 1, characterized in that the connecting wires of the sensor element are soldered on the printed circuit board.

8. The sensor module as claimed in claim 1, characterized in that an electronic circuit for converting electric sensor signals is arranged on the printed circuit board.

9. The sensor module as claimed in claim 1, characterized in that a data memory with data (K) for correcting electric sensor signals is arranged on the printed circuit board.

10. The sensor module as claimed in claim 1, characterized in that a processor by means of which sensor signals can be transformed is arranged on the printed circuit board.

11. The sensor module as claimed in claim 1, characterized in that the sensor element can be covered by a filter.

12. The sensor module as claimed in claim 1, characterized by the arrangement of a sensing tube covering the printed circuit board.

13. The sensor module as claimed in claim 1, characterized in that the sensor element is a humidity sensor.

14. The sensor module as claimed in claim 1, characterized in that the sensor element is a temperature sensor.

* * * * *